(12) United States Patent
Arbona

(10) Patent No.: US 7,178,325 B2
(45) Date of Patent: Feb. 20, 2007

(54) DIVERGENT FLAP FOR A GAS TURBINE ENGINE

(75) Inventor: Jaime A Arbona, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 119 days.

(21) Appl. No.: 10/850,252

(22) Filed: May 20, 2004

(65) Prior Publication Data

US 2005/0257529 A1    Nov. 24, 2005

(51) Int. Cl.
*F02K 1/12*    (2006.01)
(52) U.S. Cl. .................... 60/232; 239/265.39
(58) Field of Classification Search ............. 60/232; 239/265.35, 265.37, 265.39, 265.41
See application file for complete search history.

(56) References Cited

U.S. PATENT DOCUMENTS

| 5,000,386 | A | * | 3/1991 | Lybarger | ............... | 239/265.39 |
| 5,511,376 | A | * | 4/1996 | Barcza | ................ | 60/232 |
| 5,680,755 | A | | 10/1997 | Hauer et al. | | |
| 5,842,643 | A | * | 12/1998 | Lippmeier | ............. | 239/265.39 |
| 6,240,720 | B1 | * | 6/2001 | Tseng et al. | ................. | 60/770 |
| 6,658,854 | B2 | * | 12/2003 | Senile et al. | ................. | 60/771 |
| 6,935,118 | B2 | * | 8/2005 | Gould et al. | ................. | 60/771 |
| 2003/0145599 | A1 | | 8/2003 | Renggli et al. | | |
| 2004/0040308 | A1 | | 3/2004 | Senile et al. | | |

FOREIGN PATENT DOCUMENTS

EP    1 211 406 A1    6/2002

* cited by examiner

*Primary Examiner*—Ted Kim
(74) *Attorney, Agent, or Firm*—McCormick, Paulding & Huber LLP

(57) ABSTRACT

A divergent flap assembly of a gas turbine engine includes a hotsheet, a backbone structure for supporting the hotsheet, and a plow portion secured to the backbone structure to bridge a gap between the hotsheet and an external flap. The plow portion is fabricated from CMC material and has external geometry to complement and substantially continue geometry of the external flap to minimize plane detection. The plow portion is attached to the backbone structure such that when the backbone structure thermally expands, the plow portion is shifted to minimize an offset between a trailing edge of the hotsheet and the plow portion. The plow portion is fastened to the backbone structure by a plurality of fasteners, which are arranged to minimize thermal stresses.

15 Claims, 5 Drawing Sheets

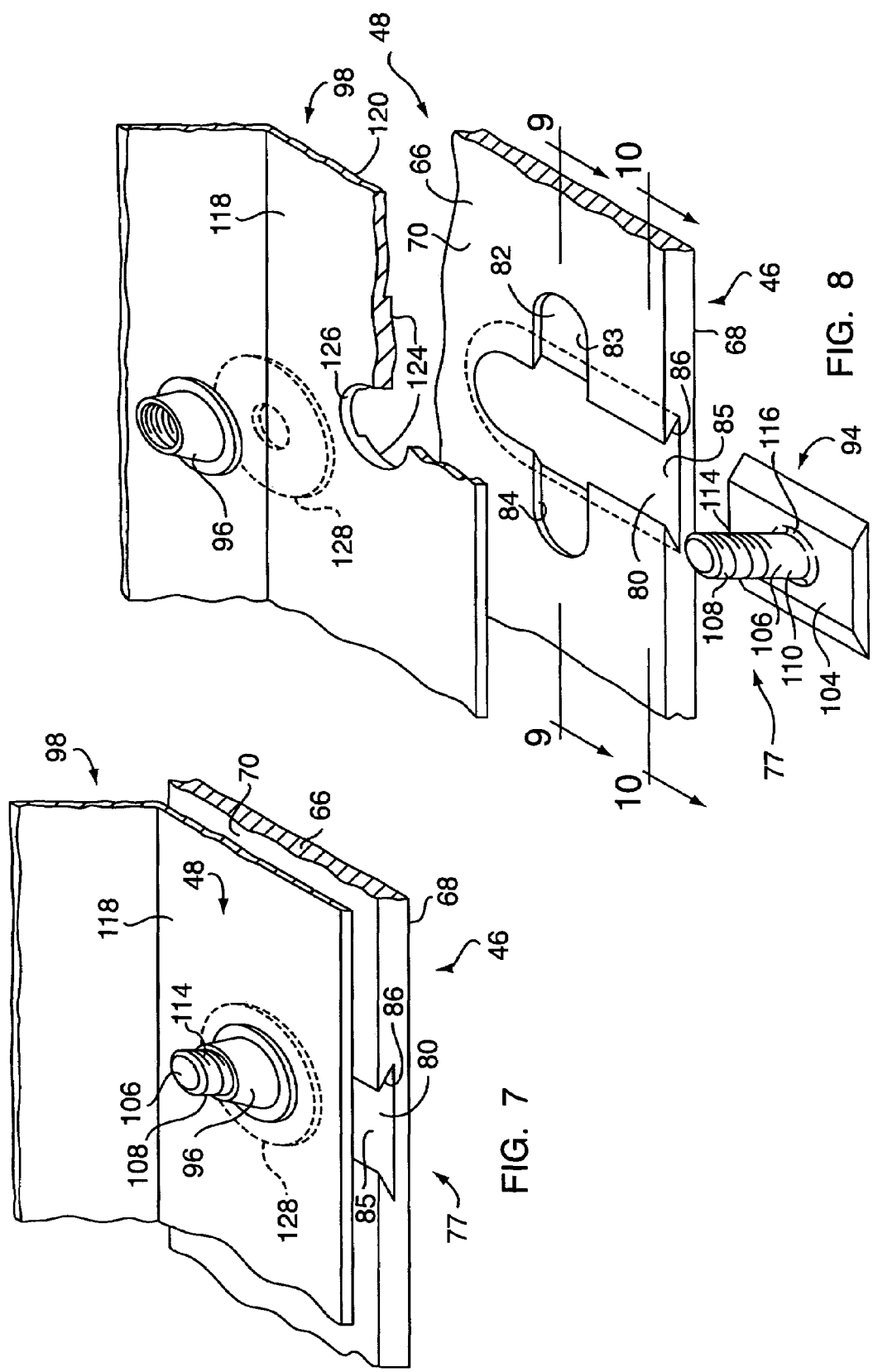

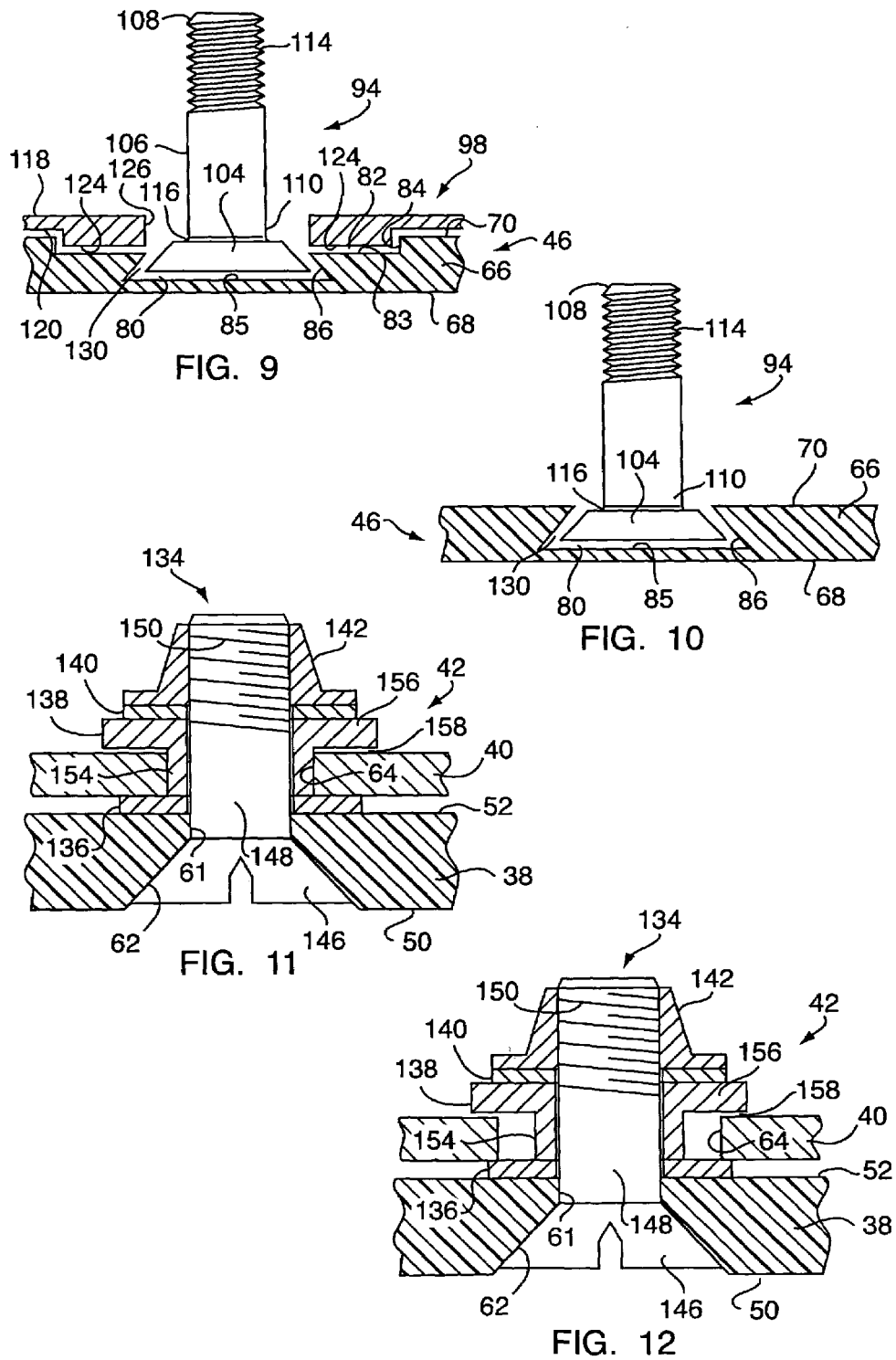

DIVERGENT FLAP FOR A GAS TURBINE ENGINE

The invention was made under a U.S. Government contract and the Government has rights herein.

BACKGROUND OF THE INVENTION

1. Technical Field

The present invention relates to gas turbine engines and, more particularly, to a divergent flap therefor.

2. Background Art

A typical gas turbine engine operates in an extremely harsh environment characterized by very high temperatures and vibrations. A conventional gas turbine engine includes a compressor for compressing entering air, a combustor for mixing and burning the compressed gases that emerge from the compressor with fuel, a turbine for expanding the hot gases to generate thrust to propel the engine, and an exhaust nozzle for allowing hot gases to exit the engine. Thus, the exhaust nozzle must accommodate extremely hot gases exiting the engine.

In military operations, design of planes to avoid detection by radar has become an important issue. The ability of the plane to remain undetected, also referred to as a signature of a plane, depends on the overall geometry of the plane and materials the plane is fabricated from. To minimize detection, it is preferable to eliminate gaps between engine parts and to achieve certain smoothness for the outer shape of the engine. Additionally, it is preferable to avoid use of metals on the outer surfaces of the engine.

Other considerations critical to engine design are avoiding air leakage and insulating certain engine components from exposure to hot gases. One type of a material that withstands hot temperatures is ceramic matrix composite (or CMC) material. However, it is difficult to attach the CMC material components to metal components. One obstacle to attaching the CMC material to the metal is different thermal expansions of the materials. In general, it is difficult to attach or join different materials in a gas turbine engine due to different thermal expansion properties.

SUMMARY OF THE INVENTION

According to the present invention, a divergent flap assembly disposed in an exhaust nozzle of a gas turbine engine includes a hotsheet having a hotsheet inner side and a hotsheet outer side extending axially, a backbone structure for supporting the hotsheet, the backbone structure being disposed radially outward of the hotsheet and substantially adjacent to the hotsheet outer side, and a plow portion secured to the backbone structure to bridge a gap between the hotsheet and an external flap. The plow portion is fabricated from CMC material and has external geometry to complement and substantially continue geometry of the external flap to minimize plane detection. The plow portion is attached to the backbone structure such that when the backbone structure thermally expands, the plow portion is shifted to minimize an offset between a trailing edge of the hotsheet and the plow portion.

According to a feature of the present invention, the backbone structure includes a plurality of openings with some of the plurality of the openings having an elongated shape to allow relative movement between the backbone structure and the hotsheet such that when the backbone structure thermally expands, the plow portion is shifted axially.

According to another feature of the present invention, the plow portion is fastened to the backbone structure by a plurality of fasteners, which are arranged to minimize thermal stresses.

According to a further feature of the present invention, the flap assembly also includes an aft support extending axially from the backbone structure toward a trailing edge of the flap assembly to minimize deflection of the hotsheet.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 7 is a schematic, perspective, broken-away view of a plow fastener assembly attaching a hotsheet of the divergent flap to a bracket;

FIG. 8 is an exploded view of the plow fastener assembly of FIG. 7 attaching the hotsheet and the bracket;

FIG. 9 is a schematic cross-sectional view of the plow fastener assembly of FIG. 8 taken along line 9—9;

FIG. 10 is a schematic cross-sectional view of the plow fastener assembly of FIG. 8 taken along line 10—10;

FIG. 11 is a cross-sectional view of an attachment fastener assembly securing a hotsheet and a backbone structure of the divergent flap of FIGS. 3 and 4 with the attachment fastener assembly passing through a substantially round hole; and FIG. 12 is a cross-sectional view of an attachment fastener assembly securing the hotsheet and the backbone structure of the divergent flap of FIGS. 3 and 4, with the attachment fastener assembly passing through an elongated slot.

DETAILED DESCRIPTION OF THE PRESENT INVENTION

Figure 1:
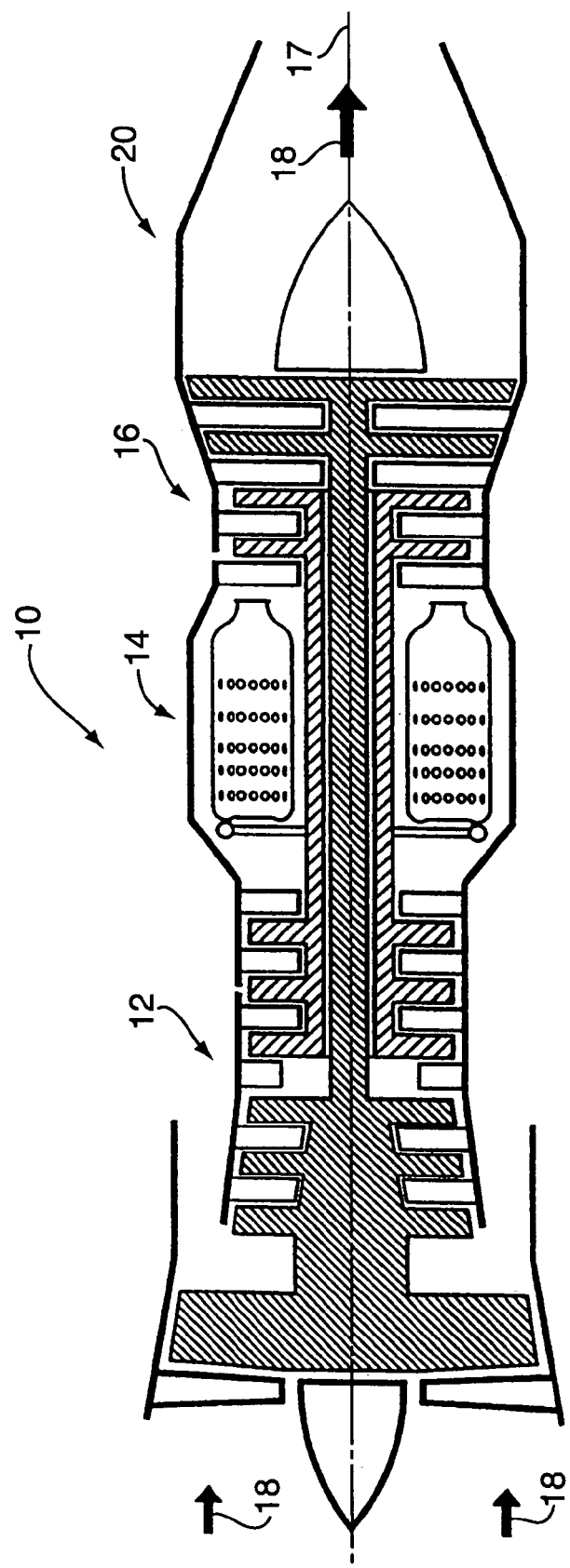
FIG. 1 is a schematic depiction of a gas turbine engine.

Referring to FIG. 1, a gas turbine engine 10 includes a compressor 12, a combustor 14, and a turbine 16 centered around a central axis 17. Air 18 flows axially through the engine 10. As is well known in the art, air 18 is compressed in the compressor 12. Subsequently, the compressor air is mixed with fuel and burned in the combustor 14. The hot gases expand generating thrust to propel the engine 10 and to drive the turbine 16, which in turn drives the compressor 12. The exhaust gases from the turbine 16 exit through the exhaust nozzle 20.

Figure 2:
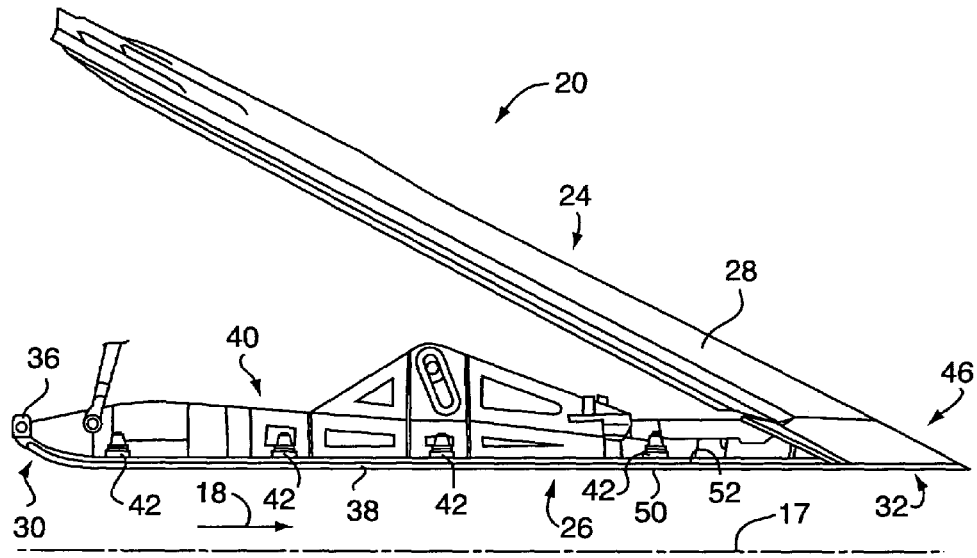
FIG. 2 is a schematic side elevational view of a divergent flap and an external flap of the gas turbine engine of FIG. 1.

Referring to FIG. 2, the exhaust nozzle 20 includes a plurality of external flaps 24 arranged circumferentially about the axis 17 and a plurality of divergent flaps 26 disposed radially inward from the external flaps. Each external flap 24 includes an external flap surface 28 having a particular geometry. Each divergent flap 26 includes a fore portion 30 and an aft portion 32. The fore portion 30 includes a hinge assembly 36 for securing the divergent flap 26 to the gas turbine engine. The divergent flap 26 further comprises a hotsheet 38 extending the length of the flap 26 from the fore portion 30 to the aft portion 32, a backbone structure 40 disposed radially outward of the hotsheet 38 and secured thereto by means for attachment 42, and a plow portion 46 disposed in the aft portion 32 of the divergent flap 26 and secured to the backbone structure 40 by a plow fastener assembly 48, shown in FIGS. 3–10.

Figure 3:
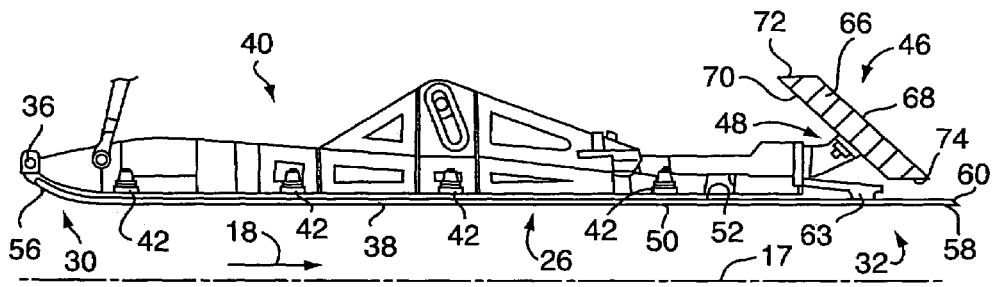
FIG. 3 is a schematic side elevational view of the divergent flap of FIG. 2 with a plow portion shown in cross-section.
Figure 4:
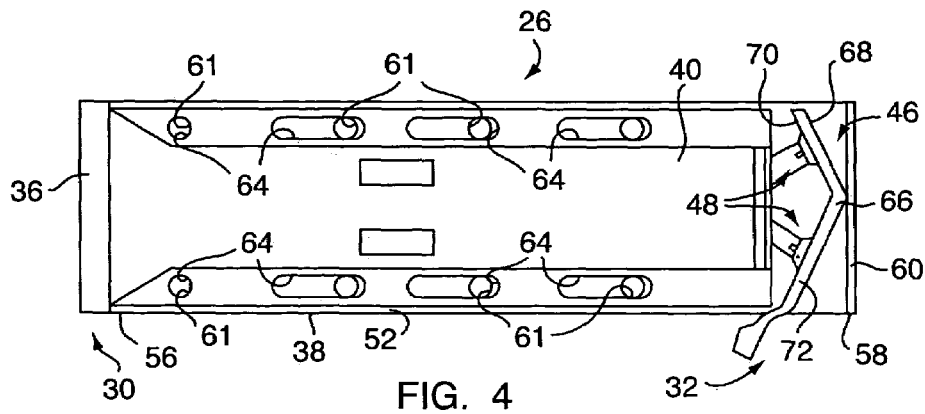
FIG. 4 is a schematic top view of the divergent flap of FIG. 3.

Referring to FIGS. 3 and 4, in the preferred embodiment of the present invention, the hotsheet 38 comprises a substantially flat substrate fabricated from ceramic matrix composite (CMC) having a hotsheet inner side 50 exposed to the exhaust gases 18 and a hotsheet outer side 52 facing the backbone structure 40. The hotsheet inner side 50 and the hotsheet outer side 52 extend from the fore portion 30 to the aft portion 32 and include a hinge edge 56 and a trailing edge 58. In the preferred embodiment, the trailing edge is defined by a chamfered surface 60. The hotsheet 38 also includes a plurality of attachment openings 61, as best seen in FIG. 4. The openings 61 also include a countersink hole 62 formed within the hotsheet inner side 50, as best seen in FIG. 11.

The backbone structure 40 extends the length of the hotsheet 38 and provides structure thereto. In the preferred embodiment, the backbone structure 40 is fabricated from metal. Additionally, in one embodiment of the present invention, the backbone structure 40 includes an aft support 63 extending into the aft portion 32 of the divergent flap 26, as best seen in FIG. 3. The backbone structure 40 also includes a plurality of backbone openings 64.

Figure 5:
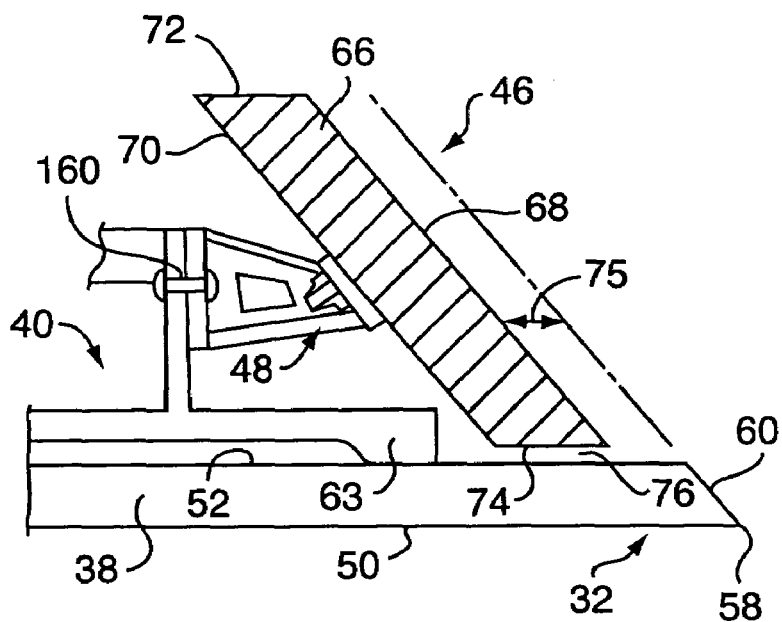
FIG. 5 is an enlarged, partial view of the divergent flap of FIG. 3 showing the plow portion in cross-section during non-operational condition.
Figure 6:
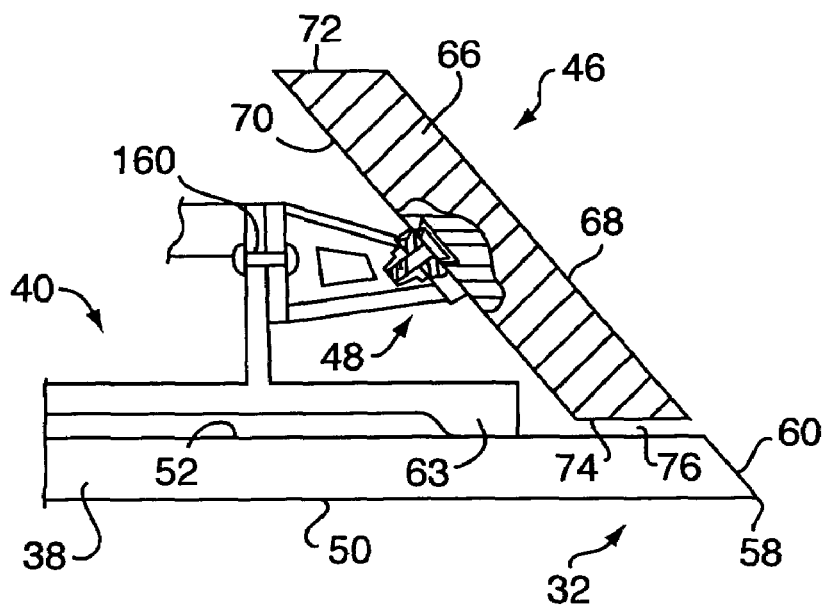
FIG. 6 is an enlarged partial view of the divergent flap of FIG. 3 showing the plow portion in cross-section during operational condition.

Referring to FIGS. 5 and 6, the plow portion 46 includes a plow body 66 having a plow outer surface 68 and a plow inner surface 70, as well as a plow outward edge 72 and a plow inward edge 74. The plow outer and inner surfaces 68, 70 have a contour to minimize plane signature and to provide optimal aerodynamic characteristics. In non-operating condition of the engine, the plow 46 is not in register with the trailing edge 58 of the hotsheet 38, as seen in FIG. 5. Rather, the plow 46 is disposed axially inward from the chamfered surface 60 and forms an offset 75 between the plow outer surface 68 and the chamfered surface 60. A gap 76 is also formed between the hotsheet outer surface 52 and the plow inward edge 74. In the preferred embodiment, the plow portion 46 is fabricated from CMC.

Referring to FIGS. 6–10, the plow 46 is attached to the backbone structure by means of the plow fastener assembly 48. In the preferred embodiment, the plow 46 includes attachment features 77 for attaching the plow portion onto the backbone structure comprising a dovetail slot 80 formed therein and a recess 82 also formed within the plow portion, as best seen in FIGS. 8 and 9. The recess 82 includes a substantially flat recess surface 83 and a recess wall 84. The dovetail slot 80 includes a bottom slot surface 85 and wedge slot surfaces 86.

Referring to FIGS. 7 and 8, the plow fastener assembly 48 includes a plow fastener 94, a nut 96, and a bracket 98. The plow fastener 94 includes a base portion 104 and a protruding portion 106 extending from the base portion. The protruding portion 106 includes a distal end 108 and a base end 110 with threads 114 formed on the distal end 108. The base portion 104 has a substantially trapezoidal shape adapted to fit into the dovetail slot 80 of the plow 46. The fastener includes a radius 116 formed at the base end 110 of the protruding portion 106 of the fastener 94, as best seen in FIGS. 9 and 10. The nut 96 is adapted to be fastened onto the threads 114 of the protruding portion 106 of the fastener 94. The bracket 98 includes a first side 118 and a second side 120 with ribs 124 formed thereon. The ribs 124 are formed to fit into the recess 82 of the plow 46, as best seen in FIGS. 8–9, and in the preferred embodiment, are formed on opposite sides of an opening 126 formed within the bracket 98. The opening 126 is adapted to allow the protruding portion 106 of the fastener 94 to fit therethrough. A Belleville washer 128 can optionally be placed between the bracket 98 and the nut 96.

Referring to FIGS. 8–10, as the plow fastener 94 is inserted into the dove-tail slot 80, a gap 130 is formed between the base portion 104 of the fastener 94 and the dovetail slot 80, as best seen in FIGS. 9 and 10. The gap 130 and the radius 116 allow for thermal expansion of the fastener 94 and minimize loading of the CMC material of the plow. As the plow fastener 94 fits into the attachment features 77 of the plow, the ribs 124 fit into the recess 82. The recess 82 includes the substantially flat recess surface 83 to accommodate the ribs 124. The recess 82 and the ribs 124 ensure retention of the plow fastener 94 within the plow 46. The Belleville washer 128 maintains the preload if components grow thermally. Although one Belleville washer 128 is shown, a plurality of washers can also be used.

Referring to FIGS. 3, 4, 11 and 12, means for attachment 42 of the CMC hotsheet 38 to the backbone structure 40 includes a fastener 134, a washer 136, a spacer 138, at least one Belleville washer 140, and a nut 142. The fastener 134 includes a head portion 146 and a body portion 148 with the body portion including a plurality of threads 150. The fastener 134 passes through the attachment opening 61 and the countersink hole 62 formed within the CMC hotsheet 38. The fastener head portion 146 fits into the countersink hole 61. The washer 136 is sandwiched between the hotsheet 38 and the backbone structure 40 and supports the spacer 138. The spacer 138 includes a cylindrical portion 154 and a ring portion 156 extending outwardly from the cylindrical portion. The cylindrical portion 154 of the spacer is substantially adjacent to the fastener body 148 and the ring portion 156 extends radially outward from the backbone structure 40 defining a spacer gap 158 therebetween, as best seen in FIGS. 6–12. The length of the cylindrical portion 154 of the spacer 138 is greater than the thickness of the backbone structure 40 disposed therein to define the gap 158. At least one Belleville washer 140 is disposed radially outward from the spacer 138 with the nut 142 tightened to clamp all the components together against the hotsheet 38 to a predetermined preload condition for a relatively tight fit without any looseness between the hotsheet 38 and other components.

Referring back to FIG. 4, the backbone structure 40 includes the plurality of backbone openings 64 to allow attachment of the backbone structure 40 onto the hotsheet 38. The backbone openings 64 proximate to the hinge assembly 36 are substantially round and sized to accommodate the body portion 148 of the fasteners 134, as seen in FIG. 11. The remaining backbone openings are formed as elongated slots to allow for movement of the backbone structure 40 relative to the hotsheet 38, as seen in FIG. 12. Thus, the backbone structure 40 is fixedly attached to the hotsheet at the fore portion 30 of the flap 26. However, the backbone structure 40 is free to translate axially as a result of thermal expansion toward the aft portion 32 of the flap 26.

In operation, once the engine 10 begins to operate, the temperature of the engine quickly rises from the ground ambient temperature to extreme high temperatures. The temperature of the gases 18 passing through the engine also rises resulting in extremely high temperatures and creates harsh environment for a majority of the gas turbine components. More specifically, as the engine 10 begins to operate, the hot gases 18 are exhausted through the exhaust nozzle 20 causing the divergent flap 26 to heat to very high temperatures. The hotsheet 38 is in contact with the exhaust gases 18 exiting the engine. The hotsheet 38 is specifically designed to withstand the hot temperatures. Although the CMC hotsheet is subjected to extremely high temperatures, the hotsheet does not expand a great deal due to the material properties of CMC. However, the metal backbone structure 40 is subject to greater thermal expansion. Therefore, as the backbone structure 40 expands, the plow 46, secured to the backbone structure, moves aft toward the trailing edge of the hotsheet 38. As the plow 46 shifts relative to the trailing edge 58 of the hotsheet 38, the offset 75 is bridged and is substantially eliminated. As the backbone structure expands, the plow outer surface 68 becomes substantially flush with the chamfered surface 60 and the external flap outer surface 28, as best seen in FIGS. 2 and 6. The extremely hot temperatures also cause the aft portion 32 of the hotsheet 38 to warp and deflect. The aft support 63 of the backbone structure 40 minimizes the deflection of the trailing edge 58 of the hotsheet 38. By minimizing deflection, contact between the plow inward edge 74 and the hotsheet 38 is also minimized.

In the plow fastener assembly 48, the dovetail slot 80 retains the fastener 94 therein. The recess 82 provides a locking feature to prevent rotation and translation of the fastener 94 with respect to the CMC sheet. The gap between the base portion of the fastener 94 and the dovetail slot 80 allows for thermal growth of the metal fastener without loading the CMC material. The Belleville washer can be placed between the nut and the feature to maintain preload when the parts thermally expand and to reduce the stiffness of the fastener assembly to minimize CMC stresses than can occur because of thermally induced tightening of the assembly.

The plow fastener assembly 48 allows attachment of a CMC sheet onto a metal structure without forming a through hole opening in the CMC sheet. Such feature is particularly critical in stealth plane design where the outer surface of the plane must be fabricated from particular materials and must not include metal fasteners on the surface thereof. Additionally, this unique attachment provides a connection between the CMC material and metal structure without leakage since a need for holes or openings is eliminated. Furthermore, the fastener 94 is insulated from the hot side 50 of the CMC sheet 38, thereby maintaining integrity of the fastener. The plow fastener assembly 48 can be used to join any CMC material with metal structure. In one embodiment of the present invention, the plow 46 is attached to the backbone structure via the bracket 98, as shown in FIGS. 5–8. The bracket 98 is fabricated from metal and can be easily attached to the backbone structure 40 subsequently by various conventional fastening means 160, such as rivets or bolts, as shown in FIGS. 5 and 6. Thus, the bracket 98 provides a bridge between the CMC sheet and other components to which the bracket can be attached by use of conventional fastening techniques. However, in this particular case, the plow can be directly attached to the backbone structure 40.

Although in a preferred embodiment the bracket 98 is included between the plow portion and the backbone structure, the plow 46 could be directly attached to the backbone structure 46. However, the bracket 98 provides a bridge between the plow portion and the backbone structure, thereby enabling the plow via the bracket to be attached to any structure by various means of a conventional attachment. Additionally, in the preferred embodiment, the plow fastener assembly 48 is disposed in one plane to accommodate for thermal expansion and minimize thermal stresses. The fastening means 160 attaching the bracket 98 to the backbone structure 40 are also disposed in such a plane to minimize any thermal stress. The backbone openings 64 formed as elongated slots and disposed within the backbone structure also allow the backbone structure 40 to thermally expand relative to the hotsheet 38, thereby moving the plow 46 toward the trailing edge 56 of the hotsheet.

The means for attachment 42 allows attachment of the CMC material to other types of materials without damaging the CMC material while applying significant tightening force to the assembly. As the nut 142 tightened onto the fastener 134, the metal of the backbone structure 46 is trapped between the spacer 138 and the washer 134 and all components are clamped together against the hotsheet 38 to a set preload for a tight fit without looseness between the CMC material and other components. The elongated slots 64 formed within the backbone structure 40 allow movement of the backbone structure relative to the hotsheet without introducing looseness to the attachment assembly 42. The Belleville washer 140 maintains preload and reduces the stiffness of the fastener assembly to minimize CMC stresses than can occur because of thermally induced tightening of the assembly. The spacer allows for the thermal growth of the backbone structure while maintaining a tight attachment of the assembly.

One advantage of the present invention is that the plow 46 bridges the gap between the hotsheet 38 and the external flap 24. This feature ensures a smooth overall contour of the engine to minimize detection of the plane. An additional advantage of the present invention is that the plow moves relative to the hotsheet 38 to bridge the offset 75 during the hot condition to further minimize detection of the plane. Another advantage of the present invention is that the plow portion 46 is fabricated from the CMC material. The plow portion, fabricated from the CMC material, minimizes signature of the plane. The features of the present invention also accommodate different rates of thermal expansion of CMC and metal components. For example, the backbone openings 64 allow relative movement between the backbone structure 40 and the hotsheet 38, thereby accommodating different rates of thermal expansion of metal and CMC material and also allowing the plow 46 to be moved toward the trailing edge 56 of the hotsheet 38 to minimize even small gaps for further improving signature of a plane. Another advantage of the present invention is that the aft portion 63 minimizes deflection of the hotsheet 38. A further advantage of the present invention is that the bracket 98 allows attachment of the CMC sheet onto any material.

Additionally, the present invention overcomes the difficulty of fastening a CMC plow portion onto metal components. The plow fastener assembly 48 eliminates a need for forming through openings in the external surface of the engine and also compensates for different rates of thermal expansion between metal and CMC.

One advantage of the means for attachment 42 is that the CMC panel can be tightened with significant force and still allow sliding motion between the CMC panel and the metal structure. Additionally, any rattling of the components within the opening is eliminated, therefore, minimizing degradation of the material and extending service life of the components. This fastening scheme not only attaches the CMC component to a dissimilar material component, but also accommodates any thermal growth mismatch and secures the CMC component under positive and negative pressure conditions. The fastening scheme permits sliding of the structure relative to the CMC panel to eliminate thermally induced stresses.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A flap assembly disposed within an exhaust nozzle of a gas turbine engine, the flap assembly comprising:
   an external flap;
   an internal flap comprising a hotsheet having a hotsheet inner side and a hotsheet outer side extending axially within the gas turbine engine; and
   a backbone structure for supporting the hotsheet, the backbone structure being disposed radially outward of the hotsheet and substantially adjacent to the hotsheet outer side; and
   a plow portion secured to the backbone structure by a thermal expansion joint, said plow portion being separate from and movable relative to said hotsheet with the thermal expansion of said backbone structure relative to both said hotsheet and said external flap, to bridge a gap between the hotsheet and the external flap.

2. The flap assembly according to claim 1 wherein the plow portion has external geometry to complement and substantially continue geometry of the external flap.

3. The flap assembly according to claim 1 wherein the plow portion is fabricated from CMC material to minimize plane detection.

4. The flap assembly according to claim 1 wherein the plow portion and the hotsheet are fabricated from CMC material and the backbone structure is fabricated from metal.

5. The flap assembly according to claim 1 wherein the plow portion is attached to the backbone structure such that when the backbone structure thermally expands, the plow portion is shifted to minimize an offset between a trailing edge of the hotsheet and the plow portion.

6. The flap assembly according to claim 1 wherein the backbone structure includes a plurality of openings with some of the plurality of the openings having an elongated shape to allow relative movement between the backbone structure and the hotsheet such that when the backbone structure thermally expands, the plow portion is shifted axially.

7. The flap assembly according to claim 6 wherein the plow portion is shifted axially to minimize an offset between a trailing edge of the hotsheet and the plow portion.

8. The flap assembly according to claim 1 wherein the plow portion is fastened to the backbone structure by a plurality of fasteners.

9. The flap assembly according to claim 8 wherein the plurality of fasteners is arranged to minimize thermal stresses.

10. The flap assembly according to claim 8 wherein the plurality of fasteners is arranged to be located in a plane.

11. The flap assembly according to claim 1 further comprising:
    an aft support extending axially from the backbone structure toward a trailing edge of the flap assembly to minimize deflection of the hotsheet.

12. The flap assembly according to claim 1 wherein the aft support is cantilevered from the backbone structure.

13. The flap assembly according to claim 1 further comprising:
    a plurality of fasteners attaching the plow portion onto the backbone structure such that each of the plurality of fasteners does not require formation of a through hole in the plow portion of the flap.

14. The flap assembly according to claim 13 wherein each of the plurality of fasteners is fabricated from metal.

15. The flap assembly according to claim 13 further comprising:
    a bracket interposed between the plurality of fasteners and the backbone structure.

* * * * *